United States Patent
Hastings

(10) Patent No.: US 11,484,039 B2
(45) Date of Patent: Nov. 1, 2022

(54) PROCESS FOR TREATING MILK

(71) Applicant: NATURO PTY LTD, Coolum Beach (AU)

(72) Inventor: Jeffrey John Hastings, Wootha (AU)

(73) Assignee: NATURO PTY LTD, Coolum Beach (AU)

( * ) Notice: Subject to any disclaimer, the term of this patent is extended or adjusted under 35 U.S.C. 154(b) by 538 days.

(21) Appl. No.: 15/741,491

(22) PCT Filed: Jul. 1, 2016

(86) PCT No.: PCT/AU2016/050579
§ 371 (c)(1),
(2) Date: Jan. 2, 2018

(87) PCT Pub. No.: WO2017/004668
PCT Pub. Date: Jan. 12, 2017

(65) Prior Publication Data
US 2018/0184677 A1 Jul. 5, 2018

(30) Foreign Application Priority Data
Jul. 3, 2015 (AU) ................................ 2015902620

(51) Int. Cl.
*A23C 3/03* (2006.01)
*A23L 3/015* (2006.01)

(52) U.S. Cl.
CPC ............... *A23C 3/03* (2013.01); *A23C 3/031* (2013.01); *A23L 3/0155* (2013.01); *A23C 2210/15* (2013.01); *A23V 2002/00* (2013.01)

(58) Field of Classification Search
CPC ....... A23C 2210/15; A23C 3/03; A23C 3/031; A23L 3/0155; A23V 2002/00; A61M 5/3216
See application file for complete search history.

(56) References Cited

U.S. PATENT DOCUMENTS

| | | | |
|---|---|---|---|
| 2,072,417 A * | 3/1937 | Berndt | A23L 3/28 204/157.67 |
| 5,701,756 A * | 12/1997 | Ghiraldi | A01J 9/04 62/393 |
| 6,085,644 A | 7/2000 | Klinksiek | |
| 6,207,215 B1 * | 3/2001 | Wilson | A23B 4/0056 426/521 |
| 6,511,695 B1 | 1/2003 | Paquin et al. | |
| 6,620,451 B1 * | 9/2003 | Miller | A23C 13/14 426/519 |
| 2004/0071842 A1 * | 4/2004 | Van Schepdael | A23L 3/0155 426/281 |
| 2005/0112252 A1 * | 5/2005 | Tewari | A23L 3/0155 426/392 |
| 2008/0152775 A1 | 6/2008 | Paquin et al. | |

FOREIGN PATENT DOCUMENTS

| | | | |
|---|---|---|---|
| CH | CL 200302020 A | 6/2005 | |
| CN | 101467559 A | 7/2009 | |
| CN | 101690515 A | 4/2010 | |
| CN | 202800030 U | 3/2013 | |
| CN | 103300143 A * | 9/2013 | |
| CN | 103704338 A | 4/2014 | |
| EP | 2 409 583 B1 | 4/2015 | |
| JP | 2008-533002 A1 | 8/2008 | |
| MX | PA05003669 A1 | 6/2005 | |
| WO | WO 2004/032655 A1 | 4/2004 | |
| WO | 2012010284 A2 | 1/2012 | |
| WO | 2012139632 A1 | 10/2012 | |
| WO | WO-2012139632 A1 * | 10/2012 | ............ B01F 3/0807 |
| WO | WO 2006/096073 A1 | 9/2016 | |

OTHER PUBLICATIONS

CN103300143translation.*
"Dairy." Merriam-Webster.com Dictionary, Merriam-Webster, https://www.merriam-webster.com/dictionary/dairy. Accessed Dec. 13, 2021. (Year: 2021).*
PCT International Search Report for PCT/AU2016/050579, Applicant: Nature Pty Ltd., Form PCT/ISA/210 and 220, dated Aug. 29, 2016 (4pages).
PCT Written Opinion of the International Search Authority for PCT/AU2016/050579, Applicant: Naturo Pty Ltd., Form PCT/ISA/237, dated Aug. 29, 2016 (6pages).
Supplementary European Search Report dated Nov. 14, 2018 for European Patent Application No. 16 82 05 64 (4pages).
Office Action dated Jan. 28, 2020 in Chile Application No. 201800009 (16 pages).
Notification of Reason(s) for Refusal dated Mar. 3, 2020 in Japanese Application No. 2017-568367 (7 pages).
Kazutaka Yamamoto, Food Processing Utilizing High Pressure No. 2—Trends, The Journal of Cookery Science of Japan, 2010, vol. 43, No. 1, pp. 44-49.

* cited by examiner

*Primary Examiner* — Jyoti Chawla
(74) *Attorney, Agent, or Firm* — Vista IP Law Group LLP

(57) ABSTRACT

A process for treating milk including the steps of: a homogenization step wherein the milk is maintained at a temperature of below about 60° C.; and, a high pressure processing step, wherein the milk is subjected to an elevated pressure above about 350 MPa wherein the elevated pressure of the high pressure processing step does not induce an increase in the temperature of the milk in excess of a limiting temperature of about 60° C. during the high pressure processing step.

19 Claims, 1 Drawing Sheet

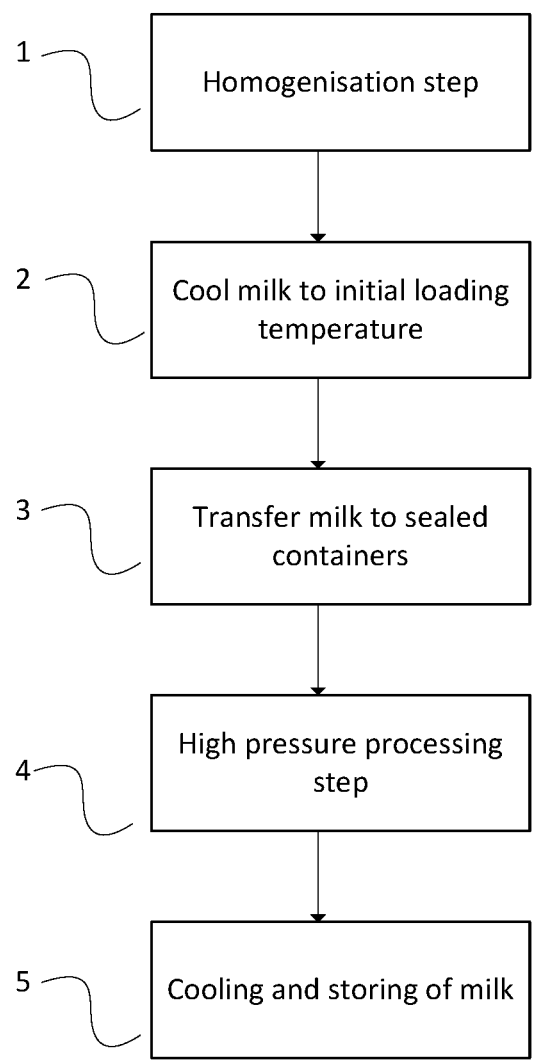

PROCESS FOR TREATING MILK

CROSS-REFERENCE TO RELATED APPLICATIONS

This application is a National Phase filing under 35 U.S.C. § 371 of PCT Patent Application No. PCT/AU2016/050579 having international date of Jul. 1, 2016, which claims the benefit of priority of Australian Provisional Patent. Application No. 2015902620 filed on Jul. 3, 2015, the contents of which are incorporated herein by reference as if fully set forth herein. Priority to the aforementioned applications is hereby claimed in accordance with 35 U.S.C. § 119, 120, 365 and/or 371 and any other applicable statutes.

TECHNICAL FIELD

The present invention generally relates to a process to treat milk and a milk product that has been treated by the process.

BACKGROUND

Raw milk typically contains microorganisms/pathogens which may be unsafe for human consumption. Processes are known to treat raw milk in order to produce milk with safe pathogenic levels for human consumption. These processes, termed pasteurization, involve exposing milk to elevated temperatures.

The most common pasteurization process involves heating the milk to a temperature of about 72.5° C. for about 15 seconds, producing milk with safe pathogenic levels for human consumption with a shelf life of approximately 14 days. Milk produced by this process is often simply referred to as pasteurized milk, fresh milk or fresh pasteurized milk.

Ultra heat treatment (UHT) treatment of milk involves pasteurizing milk at a temperature in excess of 135° C. for a period of about 4 seconds to produce a milk referred to as UHT milk, which has a relatively stable shelf life. Pasteurizing milk at a temperature of about 121° C. to produce milk referred to as extended shelf life milk (ESL), which has a shelf life of about 21 to 31 days.

The temperatures required to pasteurize milk results in significant denaturing of milk proteins and enzymes as well as alterations to some organoleptic characteristics of the milk as the processing heat increases. As a result, the nutritional quality of milk is degraded by the pasteurization process, with the degree of degradation increasing as the temperature of processing is increased. Accordingly, a trade-off between nutritional value and shelf life occurs, with pasteurized milk having a higher nutritional quality and a shorter shelf life than ESL or UHT milk. The short shelf life of pasteurized milk makes if difficult to transport and sell in certain markets, and in particularly markets where the consumers of the milk are located in an area without a significant dairy industry. These types of markets are often only provided with the nutritionally inferior but longer lasting ESL or UHT milk.

Accordingly, there is a need to produce a milk with a high nutritional value through retention of key proteins and enzymes and with an extended shelf life.

The reference in this specification to any prior publication (or information derived from it), or to any matter which is known, is not, and should not be taken as, an acknowledgement or admission or any form of suggestion that prior publication (or information derived from it) or known matter forms part of the common general knowledge in the field of endeavour to which this specification relates.

BRIEF SUMMARY

The present invention seeks to provide a process and product with improved features and properties.

According to a first aspect the present invention provides process for treating milk including the steps of: a homogenization step wherein the milk is maintained at a temperature of below about 60° C.; and, a high pressure processing step, wherein the milk is subjected to an elevated pressure above about 350 MPa wherein the elevated pressure of the high pressure processing step does not induce an increase in the temperature of the milk in excess of a limiting temperature of about 60° C. during the high pressure processing step.

According to further aspect the present invention provides the process according to the first aspect wherein the elevated pressure of the high pressure processing step induces a temperature increase in the milk such that the temperature of the milk is increased to at least about 45° C. during the high pressure processing step.

According to further aspect the present invention provides the process according to the first aspect wherein the elevated pressure of the high pressure process step induces a temperature increase in the milk such that the temperature of the milk is increased to between about 50° C. to about 55° C. during the high pressure processing step.

According to further aspect the present invention provides the process according to the first aspect wherein the milk is subjected to an elevated pressure of between about 500 MPa to about 750 MPa during the high pressure processing step.

According to further aspect the present invention provides the process according to the first aspect wherein the milk is subjected to an elevated pressure of about 600 MPa.

According to further aspect the present invention provides the process according to the first aspect wherein the milk is subjected to the elevated pressure in the high pressure processing step for a period of time such that pathogen levels in the milk are reduced to substantially safe levels for human consumption.

According to further aspect the present invention provides the process according to the first aspect wherein the milk is subjected to the elevated pressure in the high pressure processing step for about 3 minutes or less or about 4 minutes or less.

According to further aspect the present invention provides the process according to the first aspect further including the step of chilling the milk to an initial temperature prior to the high pressure processing step, wherein the initial temperature is selected such that the temperature of the milk does not exceed 60° C. during the high pressure processing step.

According to further aspect the present invention provides the process according to the preceding aspect wherein the initial temperature is selected such that the temperature of the milk is increased to between the range of about 50° C. to about 55° C. during the high pressure processing step.

According to further aspect the present invention provides the process according to the preceding aspect wherein the initial temperature is between about 33° C. to about 37° C.

According to further aspect the present invention provides the process according to the first aspect wherein the high pressure processing step is performed by packaging milk into sealed containers and immersing the sealed containers in a fluid, wherein the fluid is subsequently pressurized thereby subjecting the milk to the elevated pressure.

According to further aspect the present invention provides the process according to the first aspect wherein the temperature of the fluid before pressurization is about the same temperature as the initial temperature.

According to further aspect the present invention provides the process according to the first aspect further including the step of subjecting the milk to UV treatment and/or ozone treatment and/or bactofugation.

According to further aspect the present invention provides the process according to the first aspect wherein the process is used to treat milk obtained from bovine animals, ovine animals, caprine animals, bubaline animals or cardinal animals.

According to further aspect the present invention provides the process according to the first aspect wherein the process further includes the step of cooling milk to a temperature of below about 4° C. after the high pressure processing step.

According to further aspect the present invention provides the process according to the first aspect wherein the process further includes the step of standardizing the milk to a certain fat content.

According to further aspect the present invention provides the process according to the first aspect wherein the process is completed within about 72 hours from obtaining the milk from an animal or about 48 hours from obtaining the milk from an animal.

According to a second aspect the present invention provides process for treating milk including the steps of: (a) obtaining milk from an animal and storing the milk at a temperature of between about 0° C. and about 4° C.; and, (b) clarifying the milk; and, (c) homogenizing the milk at a temperature of between about 50° C. and about 55° C.; and, (d) packaging the milk into sealed containers; and, (e) cooling the milk to an initial temperature; and, (f) high pressure processing the homogenized milk wherein the packaged milk is immersed in a fluid subjected to elevated pressures of greater than about 500 MPa; and, (g) cooling the packaged milk to a temperature of below about 4° C. after the high pressure processing step, wherein the initial temperature is chosen such that the temperature of the milk is increased to between about 50° C. to about 55° C. during the high pressure processing step.

According to a third aspect the present invention provides milk produced by any one of the preceding aspects.

According to a further aspect the present invention provides the milk according to the third aspect wherein the milk has a shelf life of about 60 days to about 90 days.

According to an aspect, the present invention provides a process for treating milk, wherein the process includes the following steps: a homogenization step; and, a high pressure processing step, wherein the milk is subject to an elevated pressure.

Advantageously, the process of the above aspects may produce milk with reduced levels of pathogens whilst providing milk with improved nutritional values, organoleptic properties and shelf life compared to milk produced by conventional processes.

BRIEF DESCRIPTION OF FIGURES

Example embodiments should become apparent from the following description, which is given by way of example only, of at least one preferred but non-limiting embodiment, described in connection with the accompanying figures.

FIG. 1 illustrates a flowchart of the process according to the present invention.

PREFERRED EMBODIMENTS

In the figures, incorporated to illustrate features of an example embodiment, like reference numerals are used to identify like parts throughout the figures.

Referring to FIG. 1, depicted is a flowchart of a process to treat milk in accordance with an embodiment of the present invention. Instead of pasteurization, the process uses a high pressure to remove bacteria and other pathogens from milk. Using high pressures to treat milk allows the process to occur at lower temperatures than a typical pasteurization process, which may thereby avoid degradation of certain proteins and enzymes associated by high temperature processing of milk. The described process may also produce milk with a longer stable shelf life than pasteurized milk. The described process may also avoid certain organoleptic changes to milk which may otherwise occur due to pasteurization, particularly high temperature pasteurization used to produce UHT milk. The process of FIG. 1 includes the steps of homogenizing the milk 1, cooling the milk to an initial loading temperature 2, transferring the milk to sealed containers 3, subjecting the milk in the sealed containers to a high pressure processing step 4 and cooling the milk 5. However, certain optional steps may also be used by the process for treating milk as herein described.

In the example embodiment, raw milk is typically obtained by milking animals on a farm and may be reduced in temperature to between about 0° C. and about 4° C. as soon as practicable after milking. The chilled milk may then be transported to a processing site where the milk may be stored in vats at a temperature of between about 0° C. and about 4° C. in anticipation of processing.

The stored milk may then be passed through a clarifier in order to remove certain foreign materials and to help minimize any sedimentation effects that may otherwise occur when the milk is subsequently homogenized.

Milk may then undergo a preheating step where the milk may be preheated to between about 45° C. and about 60° C., and in a preferred range of between about 50° C. and 55° C. Once milk has been preheated, the milk may then undergo a homogenization step 1 where the milk is homogenized whilst the temperature of the milk is maintained between about 45° C. and 60° C., and in a preferred range of between about 50° C. and 55° C. Homogenizing the milk at temperatures below about 45° C. may induce deleterious effects in milk, such as premature rancidity and sedimentation of leucocytes and epithelial cells. If milk is heated to temperatures exceeding about 60° C. or about 58° C. denaturing of phosphatase enzymes as well as casein and whey proteins may begin to occur, thereby reducing the nutritional qualities of milk. It was found that maintaining the temperature of milk within the range of about 50° C. to 55° C. during homogenization will allow for a buffer between the deleterious effects experienced by the milk outside of the approximate 45° C. to 60° C. range.

Homogenization of the milk will reduce the size of the fat globules within the milk, and disperse the reduced globules uniformly through the milk. In this step the milk is forced under pressure through small holes to reduce the size of the fat globules, allowing them to disperse uniformly through the rest of the milk. The homogenization step 1 may be carried out when the milk is at a temperature above about 25° C. (i.e. above ambient temperature) and below about 60° C. In certain preferred embodiments the homogenization step may be carried out with milk at a temperature of between about 45° C. to about 55° C.

Following homogenization, milk may be delivered to a temperature controlled balance tank 2. The balance tank is configured to reduce the temperature of milk below the 45° C. to 60° C. range or below the preferred range of about 50° C. to about 55° C. The balance tank is also configured to maintain the temperature of the milk above the initial loading temperature of the downstream high pressure processing step. After the milk has been temperature controlled by the balance tank 2, the milk may then be transferred to a filling head. In certain embodiments, the balance tank may be located at a higher elevation than the filling head such that the milk may flow to the transfer head under the influence of gravity.

The filling head distributes the milk into individual packages 3 which may be subsequently sealed. The packages may be PET bottles, glass bottles, pouches or any other suitable package.

The packaged milk may then undergo a high pressure processing step 4. In the high pressure processing step, the packaged milk is immersed in a fluid, such as for example water, within a high pressure processing chamber and exposed to elevated pressures. As the pressure inside the high pressure processing chamber is increased, the fluid evenly exerts a hydrostatic pressure to the packaged milk. It was found that subjecting the packaged milk to the elevated pressures for a defined period of time may deactivate certain pathogens in the milk, thereby producing milk with pathogen levels substantially safe for human consumption. High pressure processing of the milk was also found to lead to milk with a longer stable shelf life than pasteurized milk, allowing the milk to be transported to markets that are too distant for pasteurized milk to access before the shelf life expires.

The elevated pressured applied to milk in the high pressure processing step may be in the order of about 350 MPa to about 1500 MPa, though other pressures may also be used. Higher pressures may require that milk is exposed to elevated pressures for a shorter period of time than lower pressures, leading to a higher throughput of milk through the process step. However, higher pressures may require more expensive equipment and involve a higher associated operating cost than lower pressures. Similarly, lower pressures may require that the milk is exposed to elevated pressures for a longer amount of time which in some circumstances may effect the commercial viability of the process. In one example embodiment, the high pressure processing step exposed the packaged milk to an elevated pressure of about 600 MPa for approximately 3 minutes in order to cause the inactivation of certain pathogens within the milk. Performing the high pressure processing step may be beneficial in avoiding higher pressure that may complicate and add to the expense of the process. It was also found that this pressure produced a milk with pathogen levels substantially safe for human consumption in a time frame of about 3 minutes. The time frame of about 3 minutes is beneficial as longer time frames may reduce the commercial feasibility of the batch operated high pressure processing step compared with other sterilization methods, although in some embodiments treatment times of 4 minutes or about 5 minutes may be acceptable. However, it is to be understood that the exact time required to reduce pathogen levels in the high pressure processing step may be a function of the properties of the milk undergoing treatment. For example, milk with a higher loading of pathogens may require a longer treatment time with high pressure processing to adequately reduce the pathogen levels. Similarly, milk with a relatively lower loading to pathogens may require a shorter treatment time with high pressure processing to achieve adequate pathogen mortality, such that high pressure processing at a pressure of less than 600 MPa may be used to achieve an adequate pathogen mortality within about 3 minutes or less. In certain non-limiting embodiments, it has been found that an elevated pressure of about 500 MPa to about 750 MPa in the high pressure processing step has been found to produce acceptable results in an acceptable time frame, although it is to be understood that certain parameters such as the initial pathogen loading of the milk and the types of pathogens present in the milk may effect the parameters at which the high pressure processing step is operated. In some embodiments, the milk may be subjected to elevated pressures for a short time frame of about 2 minutes or less or about 1 minute or less or less than about 45 seconds.

The initial loading temperature of the fluid in the high pressure processing step may be chosen to increase the mortality of certain pathogens in the milk to make the milk safer for human consumption. The loading temperature may also take into consideration the temperature rise in the high pressure processing chamber which may occur due to the elevated pressures. Without wishing to be bound by theory, a temperature rise of approximately 3° C. to 4° C. may be expected for about every 100 MPa increase in the chamber. Therefore a loading temperature of about 33° C. to about 37° C. may be selected as the temperature within the chamber for high pressure processing at about 600 MPa such that the temperature may rise from 33° C. to 37° C. to about 50° C. to 55° C. as the chamber is pressurized from atmospheric to 600 MPa. Maintaining the temperature of the milk at about 50° C. to 55° C. will comfortably avoid the temperature of about 60° C. or about 58° C. at which certain nutritional components of the milk may begin to denature. It may be beneficial to perform high pressure processing at a relatively high temperature such as about 50° C. to about 55° C. to help facilitate the mortality of pathogens in the milk, particularly pathogens that may display some resistance to high pressures, while keeping the temperature below about 58° C. or about 60° C. to avoid degradation of certain nutritional and/or organoleptic properties of the milk. However, it has been found that performing high pressure processing on milk at a temperature of about 45° C. or lower may provide for acceptable results, however, lower temperatures may require that the high pressure processing step is performed for a longer time period or at a higher pressure. The combination of elevated pressures and elevated temperatures below about 60° C. has been surprisingly found to produce milk with pathogen levels substantially safe for human consumption in a process that may be commercially viable compared to pasteurization. The milk produced by such a process may also have improved organoleptic and nutritional properties compared to pasteurized milk and may also have a longer shelf life.

Otherwise stated, it may be beneficial to perform the high pressure processing step on milk with a temperature raised above an approximate bottom limit of about 45° C. or about 50° C. to assist in the reduction of pathogen levels, but below an approximate upper limit of about 60° C. to avoid or minimize degradation of the milk in terms of nutritional value and/or organoleptic properties.

It has also been found that the temperature regime of the process to treat milk may assist in the germination of certain spore forming pathogens such as *Bacillus cereus*, such that the germinated spores may be deactivated by the elevated pressures of the high pressure processing step. For example, the temperature regime of an initial loading temperature of about 33° C. to 37° C. leading to a milk temperature of about 50° C. to about 55° C. in the high pressure processing step operated at an elevated pressure of about 600 MPa has been found to assist in the germination of certain spore forming pathogens such that the germinated spores may be more easily deactivated by the elevated pressures of the high pressure processing step. Furthermore, during the initial stages of the high pressure processing step, pressures are ramped up to the designated elevated pressure. These lower pressures at the initial stages of the ramp-up in pressure may further assist the germination of spore forming pathogens in conjunction with the temperature regime of the process, leading to easier pathogen kill at the elevated pressure. In this manner, the temperature and pressure regime if the high pressure processing step may lead to increase mortality of certain spore forming pathogens such as *Bacillus cereus*.

It has been found that homogenizing milk at a temperature between about 45° C. and 60° C., preferably between about 50° C. and 55° C., and subsequently subjecting the homogenized milk to the high pressure processing step, that the resultant milk may display substantially reduced pathogen levels, as well as improved nutritional value, shelf life and organoleptic properties when compared to milk produced by a pasteurization process.

In certain preferred embodiment, the temperature of the fluid used to pressurize the chamber of the high pressure processing step may be pre-heated to the same or similar temperature as the initial loading temperature of the milk in the high pressure processing step. By preheating the fluid, the effect of the elevated pressure will increase the temperature of the fluid to about the same degree as the elevated pressure will increase the temperature of the packaged milk. In this manner, heat transfer between the fluid and the packed milk will be minimized, thereby simplifying the process in controlling the temperature of the packed milk to between about 45° C. to about 60° C., or between about 50° C. to about 55° C. for the reasons noted above.

Following high pressure processing of the milk, the packaged milk is at a relatively high temperature, for example about 50° C. to 55° C., such that cooling 5 may be required for subsequent storage and shipping. Cooling may be achieved by any suitable cooling method step such as for example by spraying chilled water over and around the packaged milk in order to reduce the temperature of the milk to below 4° C. An alternative cooling method step may be a flash cooling step wherein the packaged milk is subjected to a reduced pressure environment which thereby reduces the temperature of the packaged milk. Cooling the milk by these methods may cause rapid temperature reduction, limiting the time that the milk is exposed to high temperatures, which may lead to an extension in the shelf life of the milk. Once the internal temperature of the milk has been brought below about 4° C. the milk may be transferred to a cold room for storage at below 4° C. until the milk is subsequently distributed to the market.

Milk treated by the high pressure processing step for a sufficient amount of time may display substantially reduced pathogen levels. The pathogen levels may be at levels safe for human consumption or at levels approaching safe for human consumption. The pathogen levels may be the same or similar to the pathogen levels of milk treated by a pasteurization process.

In some cases, depending on the pathogen loading initially present in the milk, as well as the type of pathogens present in the milk, further treatment in addition to the high pressure processing step may be required to reduce the pathogen levels in the milk. In some embodiments, UV treatment or ozone treatment of the milk may be performed to further reduce the pathogen levels of the milk if required. In some embodiments, a bactofugation step may also be performed to reduce the pathogen loading of milk before the high pressure processing step in some embodiments. For example, when treating milk with a particularly high initial loading of pathogens it may be advantageous to use one of these additional processing steps before the high pressure processing step.

The process as herein described may be used to treat milk that has been standardized to produce a treated milk with various fat and SNF levels, for example skim milk.

As used herein, milk refers to the liquid produced by the mammary glands of mammals. Milk is an emulsion or colloid of butterfat globules within a water-based fluid that contains dissolved carbohydrates and protein aggregates with minerals. The process as herein described may be used to treat milk from any animal, including: bovine, ovine, caprine, bubaline and cardinal animals. It is preferred that the milk treatment process herein described is completed within 72 hours or preferably 48 hours from the time of obtaining the milk from these animals. Milk treated in such a time frame may display improved organoleptic properties and may further display increased shelf life.

Milk produced by the process for treating milk as herein described may have certain advantages over milk treated by other processes, such as pasteurized or ESL milk in terms of preserving nutritional components of the milk and producing milk with improved organoleptic properties. Furthermore, milk treated be the process for treating milk as herein described may display a long shelf life of greater than about 45 days, or between about 60 to 90 days or more, thus surpassing the shelf life of pasteurized milk. Such an extended shelf life may allow the milk to be transported to distant markets by economical methods, such as ocean freight, such that milk with good nutritional and organoleptic properties may accessible to distant markets at an economical cost.

Many modifications will be apparent to those skilled in the art without departing from the scope of the present invention.

The invention claimed is:

1. A process for treating milk, comprising:
homogenizing the milk while maintaining the milk at a temperature less than 60° C.; and
subjecting the homogenized milk to an elevated pressure greater than about 350 MPa, wherein the elevated pressure induces an increase in a temperature of the homogenized milk between a bottom temperature of at least 45° C. and a limiting temperature of 60° C. such that the temperature of the homogenized milk does not exceed the limiting temperature of 60° C. while the homogenized milk is subjected to the elevated pressure.

2. The process according to claim 1, wherein the elevated pressure induces an increase in the temperature of the homogenized milk to between 50° C. and 55° C. while the homogenized milk is subjected to the elevated pressure.

3. The process according to claim 1, wherein the elected pressure to which the homogenized milk is subjected is between about 500 MPa and about 750 MPa.

4. The process according to claim 3, wherein the elevated pressure to which the homogenized milk is subjected is about 600 MPa.

5. The process according to claim 1, wherein the homogenized milk is subjected to the elevated pressure for a period of time such that pathogen levels in the homogenized milk are reduced to a substantially safe level for human consumption.

6. The process according to claim 1, wherein the homogenized milk is subjected to the elevated pressure for about 3 minutes to about 4 minutes.

7. The process of claim 6, wherein the homogenized milk is subjected to an elevated pressure of about 600 MPa for about three minutes.

8. The process according to claim 1, before subjecting the homogenized milk to the elevated pressure, further comprising:
chilling the homogenized milk to an initial temperature such that the temperature of the homogenized milk does not exceed 60° C. while the homogenized milk is subjected to the elevated pressure.

9. The process according to claim 8, wherein the homogenized milk is chilled to the initial temperature such that the temperature of the homogenized milk is increased to between 50° C. and 55° C. while the homogenized milk is subjected to the elevated pressure.

10. The process according to claim 9, subjecting the homogenized milk to the elevated pressure comprising:
packaging the homogenized milk into sealed containers, immersing the sealed containers into a fluid, and
after immersing the sealed containers into the fluid, pressurizing the fluid such that the homogenized milk in the sealed containers is subjected to the elevated pressure.

11. The process according to claim 10, wherein the temperature of the fluid before pressurization of the fluid is about the same as the initial temperature.

12. The process according to claim 8, wherein the initial temperature is between 33° C. and 37° C.

13. The process according to claim 1, further comprising subjecting the homogenized milk to at least one of UV treatment, ozone treatment and bactofugation.

14. The process according to claim 1, wherein the milk that is treated is bovine animal milk, ovine animal milk, caprine animal milk, or bubaline animal milk.

15. The process according to claim 1, after subjecting the homogenized milk to the elevated pressure, further comprising cooling the homogenized milk to a temperature less than about 4° C.

16. The process according to claim 1, further comprising standardizing the homogenized milk to a certain fat content.

17. The process of claim 1, wherein the process is completed within about 48 hours to about 72 hours.

18. A process for treating milk, comprising:
storing milk obtained from an animal at a storage temperature between 0° C. and 4° C.;
clarifying the milk;
homogenizing the milk at a temperature between 50° C. and 55° C.;
packaging the homogenized milk into sealed containers;
cooling the sealed containers to cool the homogenized milk in the sealed containers to an initial temperature;
immersing the sealed containers in a fluid;
subjecting the fluid to pressure such that the homogenized milk packaged in the sealed containers is subjected to an elevated pressure of at least 500 MPa, wherein the elevated pressure induces an increase in a temperature of the homogenized milk in the sealed containers between a bottom limit temperature of 50° C. and an upper limit temperature of 55° C. while the homogenized milk packaged in the sealed containers is subjected to the elevated pressure; and
cooling the sealed containers to cool the homogenized milk in the sealed containers to a temperature less than 4° C. after subjecting the homogenized milk packaged into sealed containers to the elevated pressure.

19. The process of claim 18, wherein the homogenized milk is subjected to an elevated pressure of about 600 MPa for about three minutes.

\* \* \* \* \*